(12) United States Patent
Jorgensen et al.

(10) Patent No.: US 7,574,357 B1
(45) Date of Patent: Aug. 11, 2009

(54) APPLICATIONS OF SUB-AUDIBLE SPEECH RECOGNITION BASED UPON ELECTROMYOGRAPHIC SIGNALS

(75) Inventors: C. Charles Jorgensen, Palo Alto, CA (US); Bradley J. Betts, Burlingame, CA (US)

(73) Assignee: The United States of America as represented by the Admimnistrator of the National Aeronautics and Space Administration (NASA), Washington, DC (US)

( * ) Notice: Subject to any disclaimer, the term of this patent is extended or adjusted under 35 U.S.C. 154(b) by 503 days.

(21) Appl. No.: 11/169,265

(22) Filed: Jun. 24, 2005

(51) Int. Cl.
*G10L 11/06* (2006.01)
*G10L 19/00* (2006.01)
*G10L 21/00* (2006.01)
*G10L 21/02* (2006.01)

(52) U.S. Cl. .................. 704/236; 704/201; 704/208; 704/227; 704/231

(58) Field of Classification Search ............... 704/247, 704/201, 208, 231, 236
See application file for complete search history.

(56) References Cited

U.S. PATENT DOCUMENTS 6,151,571 A * 11/2000 Pertrushin .................. 704/209
6,182,039 B1 * 1/2001 Rigazio et al. ............. 704/257
6,366,908 B1 * 4/2002 Chong et al. ................ 707/3
2004/0044517 A1 * 3/2004 Palmquist ..................... 704/7
2006/0129394 A1 * 6/2006 Becker et al. .............. 704/235

OTHER PUBLICATIONS

Manabe et al. 'Unvoiced Speech Recognition using EMG—Mime Speech Recognition—', CHI '03 extended abstracts on Human factors in computing systems, Ft. Lauderdale, Florida, pp. 794-795.*
Brady, et al., Multisensor MELPe Using Parameter Substitution, IEEE International Conference on Acoustics, Speech, and Signal Processing, May 17-21, 2004, I-477-480, 1, IEEE.
Graciarena, et al., Combining Standard and Throat Microphones for Robust Speech Recognition, IEEE Signal Processing Letters, Mar. 2003, 72-74, 10-3, IEEE.
Jou, et al., Whispery Speech Recognition Using Adapted Articulatory, IEEE International Conference on Acoustics, Speech, and Signal Processing, Mar. 18-23, 2005, 1009-1012, 1, IEEE.
Junqua, et al., The Lombard Effect: A Reflex to Better Communicate With Others in Noise, IEEE Internationl Conference on Acoustics, Speech, and Signal Processing, Mar. 15-19, 1999, 2083-2086, 4, IEEE.

(Continued)

*Primary Examiner*—David R Hudspeth
*Assistant Examiner*—Justin W Rider
(74) *Attorney, Agent, or Firm*—John F. Schipper; Robert M. Padilla

(57) ABSTRACT

Method and system for generating electromyographic or sub-audible signals ("SAWPs") and for transmitting and recognizing the SAWPs that represent the original words and/or phrases. The SAWPs may be generated in an environment that interferes excessively with normal speech or that requires stealth communications, and may be transmitted using encoded, enciphered or otherwise transformed signals that are less subject to signal distortion or degradation in the ambient environment.

27 Claims, 9 Drawing Sheets

OTHER PUBLICATIONS

NG, et al., Denoising of Human Speech Using Combined Acoustic and EM Sensorsignal Processing, IEEE International Conference on Acoustics, Speech, and Signal Processing, Jun. 5-9, 2000, 229-232, 1, IEEE.

Shahina, et al., Language Identification in Noisy Environments Using Throat Microphone Signals, Conference on Intelligent Sensing and Information Processing, Jan. 4, 2005, 400-403, IEEE.

* cited by examiner

APPLICATIONS OF SUB-AUDIBLE SPEECH RECOGNITION BASED UPON ELECTROMYOGRAPHIC SIGNALS

FIELD OF THE INVENTION

This invention relates to analysis and communications applications of electromyographic signals produced in a human body

BACKGROUND OF THE INVENTION

Communications between two or more humans, or between a human and a machine, is traditionally dominated by visual and verbal information and alphanumeric input. Efforts to automate human-to-human or human-to-machine communication, such as commercial speech recognition, have emphasized the audible aspects. A totally auditory communication strategy places a number of constraints on the communication channels, including sensitivity to ambient noise, a requirement for proper formation and enunciation of words, and use of a shared language. The physical limitations of sound production and recognition also become problematic in unusual environments, such as those involving hazardous materials (HAZMATs), extra vehicular activity (EVA) space tasks, underwater operations and chemical/biological warfare (CBW). Conventional auditory expression may be undesirable for private communication needed in many situations encountered daily, such as discrete or confidential telephone calls, offline or sotto voce comments during a teleconference call, certain military operations, and some human-to-machine commands and queries. Communication alternatives that are both private and not dependent upon production of audible signals are valuable.

*Emergency response teams face dangerous and challenging communication difficulties from presence of heavy smoke, hazardous substance gases, speech restrictions arising from use of self-contained breathing apparati ("SCBAs"), self-contained underwater breathing apparatus (SCUBA), and high external noise levels, among other things. Where a responder wears an SCBA, an in-mask microphone or external voice-only communication gear can be overwhelmed or masked by air hiss, heavy breathing, and signal degradation from breath moisture and perspiration within the SCBA during a response, and external ambient noise. New threats to homeland security require use of even more protective gear, where audio communication problems become more severe. Issuance of stealth commands to a robot control system, or of stealth communications on a cell phone (e.g., by a SWAT team member or an Air Marshall aboard an aircraft), also requires use of relatively silent audio input.

One proposed method for studying alternative means of communication is direct understanding of brain signals, which bypasses speech and its analysis altogether. J. R. Wolpaw et al, "Brain-computer interface technology: a review of the first international meeting," I.E.E.E. Trans. on Rehabilitation Engineering, vol. 8 (2000)164-171, recently published a review of electroencephalograph (EEG) analysis. Several practical difficulties are encountered for near term application of pure EEG approaches, due to use in EEG of aggregated surface measured brain potential and/or use of a large number of EEG sensors. Additionally, one confronts the nonlinear complexity and idiosyncratic nature of the signals. An alternative, invasive EEG measurement and analysis, is not considered practical for widespread use, except for extreme medical conditions.

What is needed is a sub-audible communication system that provides one or more tiers, in addition to conventional audible communication, to exchange or transfer information compactly, reliably and reasonably accurately. Preferably, the amount of computation required should be modest and should not be out of proportion to the information obtained through the signal processing, should be resistant to the presence of noise and should allow soundless communication in difficult environments.

SUMMARY OF THE INVENTION

These needs are met by the invention, which provides and applies a system for receipt and analysis of sub-audible signals to estimate and provide a characterization of speech that is sotto voce or is not fully formed for purposes of normal speech recognition. This system relies on surface measurement of muscle signals (i.e., electromyographic "EMG" signals) to discriminate and recognize sub-audible speech signals produced with relatively little acoustic input. In one alternative, EMG signals are measured on the side of a subject's throat, near the larynx, and under the chin near the tongue, to pick up and analyze surface signals generated by a tongue (so-called electropalatogram "EPG" signals)

*Sub-audible speech is a new form of human communication that uses tiny neural impulses (EMG signals) in the human vocal tract rather than audible sounds. These EMG signals arise from commands sent by the brain's speech center to tongue and larynx muscles that enable production of audible sounds. Sub-audible speech arises from EMG signals intercepted before an audible sound is produced and, in many instances, allows inference of the corresponding word or sound. Where sub-audible speech is received and appropriately processed, production of recognizable sounds is no longer important. Further, the presence of noise and of intelligibility barriers, such as accents associated with the audible speech, no longer hinder communication. Neural signals are consistent, arising from use of a similar communication mechanism between (sub-audible) speaker and listener.

*This approach relies on the fact that audible speech muscle control signals must be highly repeatable, in order to be understood by others. These audible and sub-audible signals are intercepted and analyzed before sound is generated by air pressure using these signals. The recognized signals are then fed into a neural network pattern classifier, and near-silent or sub-audible speech that occurs when a person "talks to himself or to herself" is processed. In this alternative, the tongue and throat muscles still respond, at a lowered intensity level, as if a word or phrase (referred to collectively herein as a "word") is to be made audible, with little or no external movement cues present. Where sufficiently precise sensing, optimal feature selection and good signal processing are available, it is possible to analyze these weak signals to perform useful tasks without conventional vocalization, thus mimicking an idealized thought-based approach.

*This approach uses a training phase and a subsequent word recognition phase. In the training phase, the beginning and end of a sub-audible speech pattern ("SASP") is first determined for each of R spoken instances of a word in a database. This includes Q words in a window of temporal length 1-4 sec each (preferably about 1.5 sec) that are provided and processed. A signal processing transform is applied to obtain a sub-sequence of transform parameter values, which become entries in a matrix M, where the two matrix axes may represent scale factors and time intervals associated with a window. The matrix M is tessellated into groups of cells (e.g., of rectangular or other shape), each cell is represented by a feature value for that cell, and the cell features are rearranged as a vector. Weighted sums of the vector components are formed and subsequently used as comparison indices. This completes the training phase and provides a lexicon of words available for comparison.

*In the word recognition phase, a SASP including an unknown word is provided and sampled, as in the training phase. The training phase procedures are applied to the SASP, and error indices $\Delta 2(q)$ (numerical differences between each training phase index q and the corresponding SASP index) are computed. If at least one word (q=q0) can be found for which $\Delta 2(q0)$ is no greater than an error threshold $\epsilon$(thr), at least one word (q=q0) in the lexicon with minimum error is interpreted as corresponding to the unknown word.

*The training phase is a learning procedure, whereby the system learns to distinguish between different features of known words in a database and provides reference sets of neural net weight coefficients for this purpose. In a second (word recognition) phase, the weight coefficients are applied to one or more unknown words to determine if an unknown word is sufficiently similar to a word in the database. This technique provides several advantages, including minimization of word variations through: (i) use of similar communication mechanisms (useful because muscle patterns for a given person are stable and reproducible) and (ii) use of reliable speech recognition techniques to locate vowels and consonants and to identify a time interval corresponding to generation of a particular vowel and/or consonant combination. This approach provides non-invasive sensing, reasonably robust response to physiological variations, and privacy.

*Separating speech from sound generation allows new communication options. For example, words spoken sub-audibly by a handicapped person with some consistent voice muscle behavior may now be understood, even where the corresponding audible words might not be understood. An example is a laryngectomy patient where vocal cords are removed. Another example is a deaf person who cannot hear what his/her audible speech sounds like to others. Use of sub-audible speech can overcome large speech generation impediments associated with underwater diver mouthpieces, with emergency responder breathing units and with the presence of extreme audible noise.

*Sub-audible speech can be used for reliable communication by medical service workers, emergency service workers (firefighters, hazardous substance first responders, etc.), homeland security investigators, SWAT team members, Air Marshalls, special forces, physically disabled and speech-disabled persons, and for interactive database searches, PDA data access, robotic command/control, and silent cellular phones.

DESCRIPTION OF BEST MODES OF THE INVENTION

Figure 1:
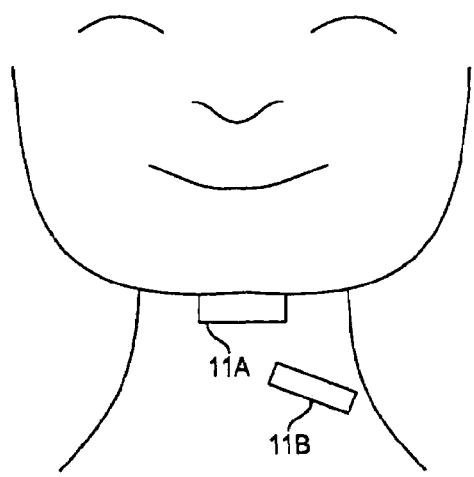
FIG. 1 illustrates placement of signal recording electrodes in an initial experiment on sub-audible speech analysis.
Figure 2A:
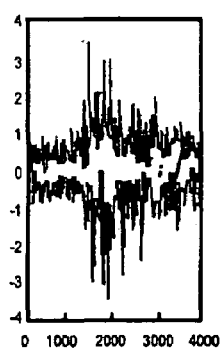
FIGS. 2A-2F are graphical views of sub-audible signals corresponding to the generic words "stop", "go", "left", "right", "alpha" and "omega."
Figure 2B:
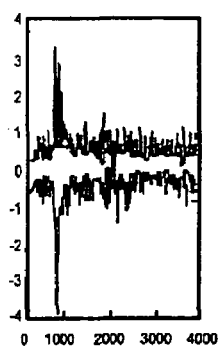
Figure 2C:
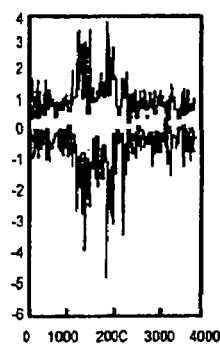
Figure 2D:
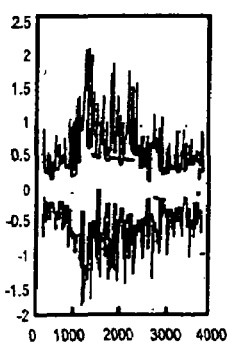
Figure 2E:
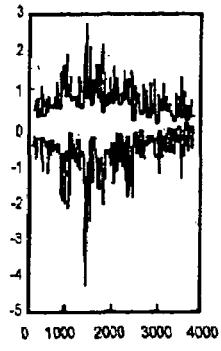
Figure 2F:
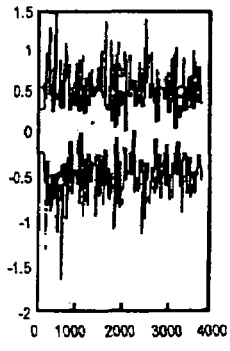

In some initial tests, sub-audible pronunciation of six English words ("stop", "go", "left", "right", "alpha" and "omega") and ten numerals ("1", "2", "3", "4", "5", "6", "7", "8", "9" and "0") were recorded for each of three subjects, ages 55, 35 and 24, to provide a control set of words for a small graphic model that might be used to provide commands on a Mars Rover system, for example. The words "alpha" and "omega" may be used to enter a command to move faster or slower, or up or down, or forward or backward, as appropriate under the circumstances. EMG data were collected for each subject, using two pairs of self-adhesive Ag/Ag—Cl electrodes, located near the left and right anterior external area of the throat, about 0.25 cm back from the chin cleft and about 1.5 cm from the right and left sides of the larynx, as indicated in FIG. 1. Initial results indicate that one pair, or more pairs if desired, of electrodes, located diagonally between the cleft of the chin and the larynx, preferably in non-symmetrical locations, will suffice for recognition in small word sets. Signal grounding usually relies on attachment of an additional electrode to the right or left wrist, jaw bone or another location on the body. When data are acquired using wet electrodes, each electrode pair is connected to a commercial signal amplifier (Neuroscan or equivalent) and recorder that records the EMG responses at a sampling rate of up to 20 kHz. A 60 Hz notch filter is used to reduce ambient signal interference.

One hundred or more exemplars for each word were initially recorded for each subject over a six-day interval, in morning and afternoon sessions. In a first group of experiments, the signals were sectioned offline into two-second time windows with variable window start times, and extraneous signals (coughs, swallows, body noises, etc.) were removed using SCAN 4 Neuroscan software. FIGS. 2A, 2B, 2C, 2D, 2E and 2F graphically illustrate representative EMG blocked signals for six windows, corresponding to the words "stop", "go", "left", "right", "alpha" and "omega", respectively. The blocked signals for these words are not wholly reproducible and may be affected by the test subject's health and the time (of day) the particular signal is recorded and analyzed. The technique must also take into account the changing signal-noise ratio and/or changing amplitudes of the signals.

For signal feature processing, Matlab scripts were developed to provide a uniform signal processing system from recording through network training. These routines were used to receive and transform the raw signals into feature sets, to dynamically apply a threshold to the transformed signals, to adjust signal-to-noise ratios, and to implement neural network algorithms for pattern recognition and training. EMG artifacts, such as swallowing, muscle fatigue tremors and coughs, were removed during preprocessing of the windowed samples. In a real time application, artifact filters would be incorporated to prevent such anomalies from being classified.

Sectioned signal data for each word were transformed into usable classifier feature vectors using preprocessing transforms, combined with a coefficient reduction technique. Several transforms were tested, including: (i) a short time interval Fourier Transform (STFT), requiring multiple overlapping windows; (ii) discrete wavelets (DWTs) and continuous wavelets (CWTs) using Daubechies 5 and 7 bases; (iii) dual tree wavelets (DTWTs) with a near sym_a 5,7 tap filter and a Q-shift 14,14 tap filter; (iv) Hartley Transforms; (v) Linear Predictive Coding (LPC) coefficients and (vi) uniformly and nonuniformly weighted moving averages. Feature sets were created differently for each of these transform approaches, depending upon the unique signal processing approaches, with different pattern discriminations.

The most effective real time SPTs were the windowed STFTs and the DTWT coefficient matrices, each of which was post-processed to provide associated feature vectors. One suitable procedure is the following. Transform coefficient vectors are generated for each word, using, for example, the STFT or the DTWT applied to the magnitude (absolute value) of the raw signal amplitude. Where unipolar, rather than bipolar, electrodes are used, positive and negative sign signals are distinguishable, and STFTs and DTWTs could be applied to the raw signal amplitudes without automatic formation of an absolute value. Vectors were post processed using a Matlab routine to create a matrix M of spectral coefficients. This matrix is tessellated into a set of sub-matrices or cells, depending upon the spectral information complexity. Tessellation sizes were determined in part by average signal energy in a given region of the spectral matrix. Uses of equal and unequal segmentation sizes can be used. A representative value was calculated for each candidate sub-matrix, to reduce the number of features or variables presented to the pattern recognition algorithm and to represent average coefficient energy.

In one approach, simple mean or average signal energy within a cell was used as a cell representative or "feature." Other first order statistical values, such as medians, modes and maximum sub-matrix values, can be used but appear to provide no substantial improvement over use of a simple mean of signal energy. The result of this approach is a fixed length feature vector for each sub-audible word tested. Dual tree wavelets are attractive here, as opposed to standard discrete wavelets, to minimize the normal wavelet sensitivity to phase shifts. Continuous wavelets (CWTs) are not presently practical for real time computations. The Hartley Transform, which provides additional information on signal behavior along a non-real line in the transform plane, was also explored, as was use of moving averages of various lengths.

*In another approach, a set S(M) of one or more local maxima of magnitudes of the matrix entries M(i,j) is identified within the matrix M. Tessellation into (possibly non-uniform) cells C (each containing one of the local maxima) is determined by identifying an exhaustive, mutually exclusive set SS(M) of subsets (not necessarily rectangular) of M for which a weighted sum of variances of the subsets in SS(M) is minimized. A beginning member of a given subset may be an entry with the largest magnitude, among all entries not belonging to any other subset. This approach offers the advantage that the variances of matrix entry magnitudes within each cell C in the resulting set of subsets SS(M) is reduced, or even minimized so that these magnitudes are, in some sense, closer to all other entries in the same subset. A disadvantage of this approach is that it is computationally intensive. However, the computations only need be done once, in the training phase. A feature of each subset is determined as in the first approach.

Feature vectors for each instance of a word are used to train a neural network (NN) word recognition engine. Accuracy of recognition is evaluated using about 20 percent of the untrained word exemplars and signals from only one electrode pair, which is randomly drawn from the collection of electrode pairs, in a data recording session.

Five NN paradigms were considered for signal training classification, using the entire feature set: (1) scaled conjugate gradient nets; (2) Leavenberg-Marquardt nets; (3) probabilistic neural nets (PNNs); (4) modified dynamic cell structure (DCS) nets; and (5) linear classifiers. After comparison of the results, a scaled conjugate gradient net was chosen, for the following reasons. A Leavenberg-Marquardt net reaches the lowest mean square error level but requires too much system memory when dealing with large data sets, even where reduced memory variations are used. A signal having a low mean square error (MSE) does not necessarily correspond to, or produce, an improved generalization for new signals, where high sensor noise is present. PNN nets provide reasonable classifications but require very large training sample sizes to reach stable probabilities and do not appear to be superior in ultimate pattern discrimination ability. A dynamic cell structure (DCS) net provides fast net training, which is attractive for real time adaptation, but is less compact for the anticipated applications that are memory sensitive. A scaled conjugate gradient network has fast convergence with adequate error levels for the signal-noise ratios encountered in the data; and the performance is comparable to the Leavenberg-Marquardt performance. The scaled conjugate gradient network uses a "trust" region gradient search criterion, which may contribute to the superior overall results of this approach. However, with improved computing ability, any of the signal training approaches can be used here.

In other EMG tasks, we successfully applied Hidden Markov Models (HMMs), but these appear to be most effective for non-multi-modal signal distributions, such as are associated with single discrete gestures, rather than with the temporally non-stationary, sub-audible signal patterns of concern here. An HMM approach also requires sensitive pre-training to accurately estimate transition probabilities. A hybrid HMM/neural net approach, is an alternative.

In order to quickly explore many experimental situations using different transform variations, we have operated in a simulated real time environment that has been developed and used at N.A.S.A. Ames, wherein EMG signals are recorded to file and are later used to train and test the signal recognition engines. Our initial three test subjects were not given immediate feedback about how well their sub-audible signals were recognized. However, some learning occurred as each test subject was permitted to view his or her EMG signals.

Figure 3:
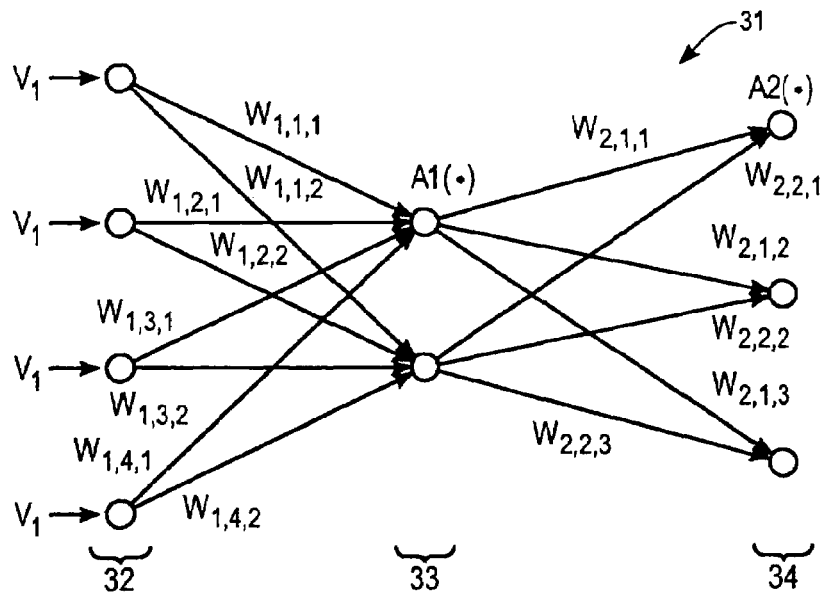
FIG. 3 illustrates a simplified neural network classifier, with one hidden layer, that may be applied in practicing the invention.

FIG. 3 illustrates a simplified example of a neural network classifier 31 with one hidden layer, configured to analyze a vector of feature values provided according to the invention. The NN configuration 31 includes a first (input) layer 32 having four input nodes, numbered k=1, ..., K (K=4 here), a second (hidden) layer 33 having two intermediate nodes, numbered h=1, ..., H (H=2 here), and a third (output) layer 34 having three output nodes, numbered g=1, ..., G (G=3 here). A practical neural net classifier may have tens or hundreds of input nodes, hidden layer(s) nodes and output nodes. The input values $v_k$ received at the first layer of nodes are summed and a first activation function A1 is applied to produce $$u_h = A1\left\{\sum_{k=1}^{K} w_{1,k,h} \cdot v_k + 1 \cdot b\right\} \quad (h = 1, \ldots, H), \tag{1}$$

where the quantities $w_{1,k,h}$ are weight coefficients connecting the nodes in the first layer to the nodes in the second layer and b is a bias number. The intermediate values received at the second layer are summed and a second activation function A2 is applied to produce $$t_g = A2\left\{\sum_{h=1}^{H} w_{2,h,g} \cdot u_h + 1 \cdot b\right\} \quad (g = 1, \ldots, G), \quad (2)$$

where the quantities $w_{2,h,g}$ are weight coefficients connecting the nodes in the second layer to the nodes in the third layer. Here, A1 and A2 may be, but need not be, the same activation function, and more than one activation function can be used in a given layer. More than one hidden layer can be included, by obvious extensions of the notation. This formalism will be used in the following development of the NN analysis, in FIGS. 4 and 5.

Training Procedure.

The term "training procedure," according to one embodiment of the invention, includes the following actions: (1) receive R spoken instances, of a sub-audible EMG signal, for at least one known word; (2) detect the beginning of each SASP containing an instance, using a thresholding procedure; (3) for each SASP, create a window, having a selected length Δt(win), that includes the SASP; (4) apply a "signal processing transform" (SPT) to each instance of one of the SASPs; (5) form a matrix (which can be one-dimensional, a vector) from the SPT values for each instance of the SASP; (6) tessellate the matrix into cells, with each cell represented by a cell "feature", for each instance; (7) (re)format the cell features as entries or components of a vector; (8) (optionally) normalize the vector entries; (9) receive the vector entries for each instance of the SASP in a neural network classifier; (10) for all instances of each word, identify sets of reference weight coefficients for the vector entry values that provide a best match to a reference pattern that corresponds to the words considered; and (11) use the reference weight coefficients in a neural network analysis of an unknown word received by the system.

Figure 4A:
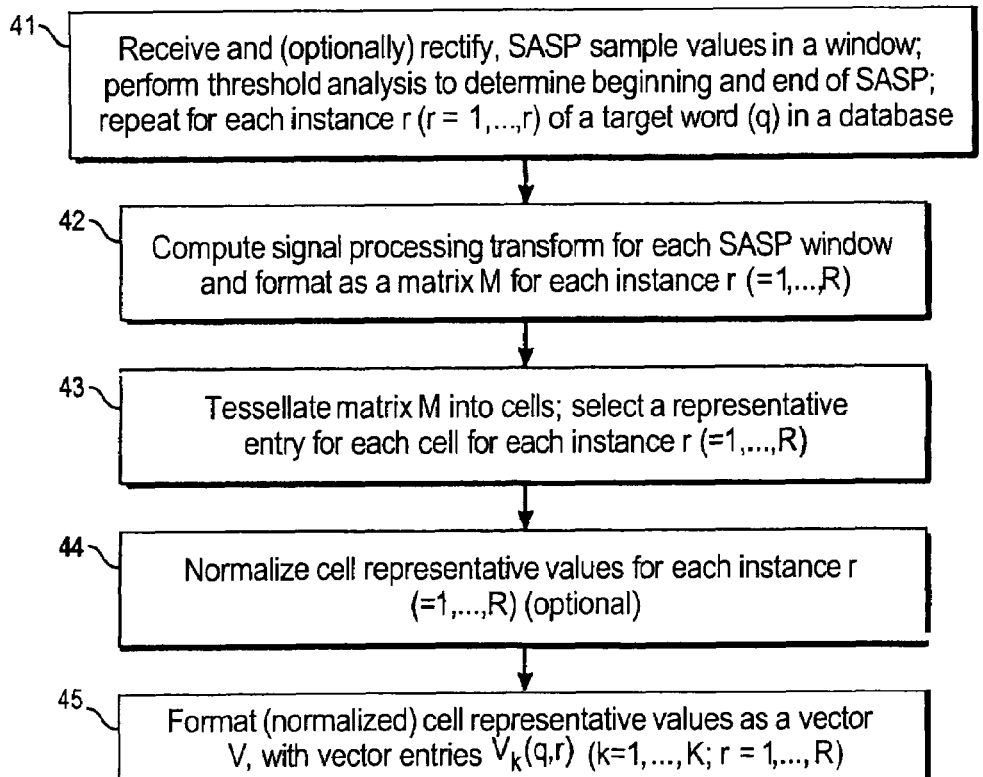
FIGS. 4 and 5 are high level flow charts of procedures for practicing a training procedure and a word recognition procedure according to the invention.
Figure 4B:
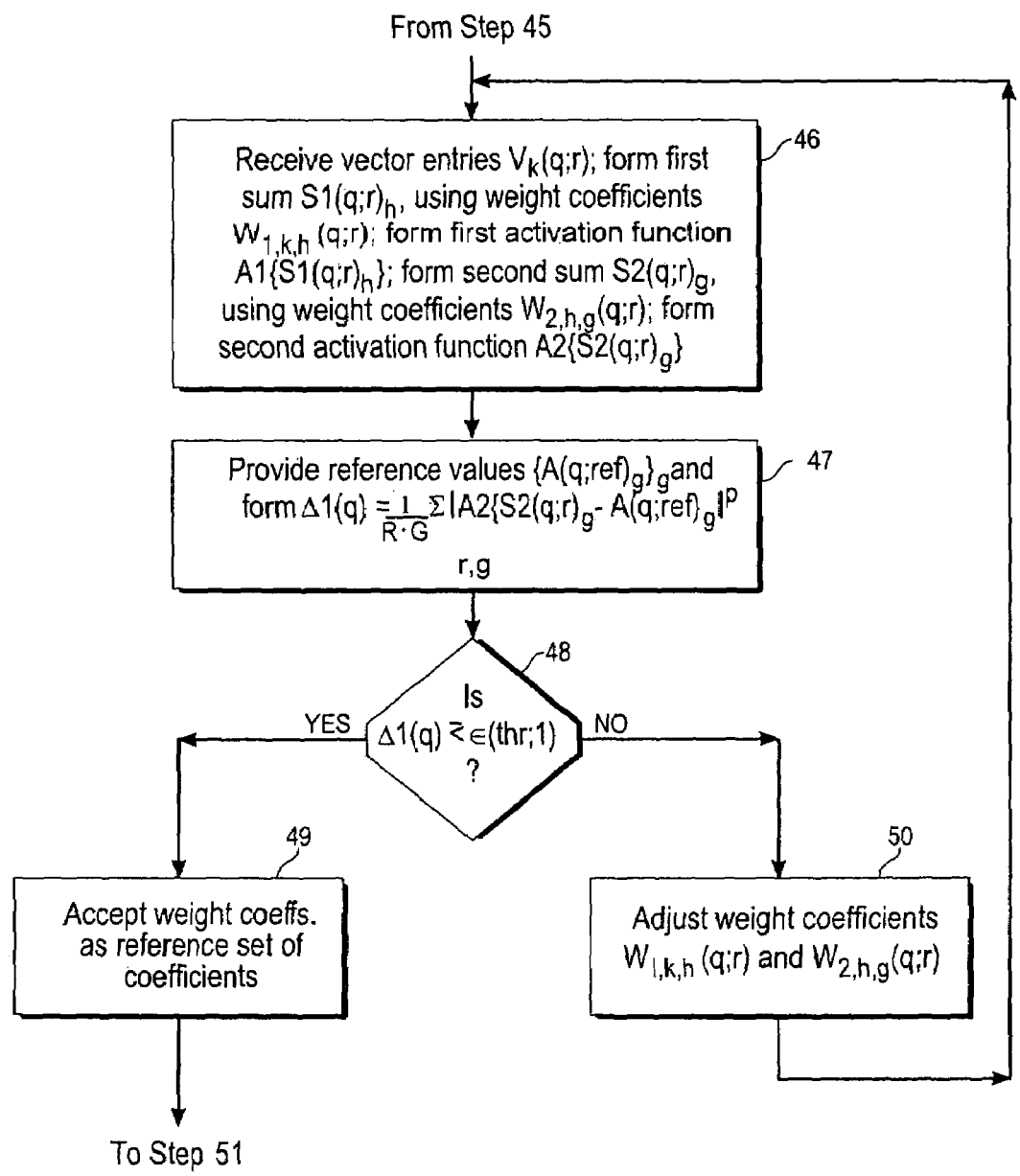

FIG. 4 is a high level flow chart illustrating a procedure for practicing a training procedure according to the invention. In step 41, a sequence of length Δt(win)=1-4 sec (preferably, Δt(win)=1.5 sec) of sampled signal values is received, and a sample thresholding operation is performed to determine where, in the sequence, a sub-audible speech pattern (SASP) begins. SASPs representing samples of a known word at a selected rate (e.g., about 2 kHz) are identified, recorded and optionally rectified. Signal rectification replaces the signal at each sampling point by the signal magnitude (optional). R spoken instances, numbered r=1, . . . , R(R≧10), of a given word (SASP) are preferably used for training the system to recognize that SASP.

In step 42, a Signal Processing Transform operation is performed on the pattern SASP over the window length Δt(win) for each spoken instance r=1, . . . , R, and for each word, numbered q=1, . . . , Q in a database, to provide a spectrum for the received signal for each of the windowed samples. As used herein, a "Signal Processing Transform" (SPT) has a finite domain (compact support) in the time variable, provides a transform dependent upon at least one transform parameter (e.g., window length, number of samples used in forming the transform, scale factor, frequency, etc.), allows summation or integration over this parameter, and a collection of these transforms for different values of the transform parameter is mathematically complete.

The SPT operation in step 42 may rely upon a short time interval Fourier transforms (STFTs), discrete wavelets (DWTs) and continuous wavelets (CWTs) using Daubechies 5 and 7 bases; dual tree wavelets (DTWTs) with a near_sym_a 5,7 tap filter and a Q-shift 14,14 tap filter; Hartley Transforms; Linear Predictive Coding (LPC) coefficients, and uniformly and nonuniformly weighted moving averages, or any other suitable transforms. The spectrum obtained by this operation (expressed as a function of one or more transform parameters) is a sequence of data transform samples, formatted as an m-row-by-n-column matrix M (or as a vector, with m=1 or n=1) having a first matrix axis (along a row) and a second matrix axis (along a column), with each matrix entry representing a concentration or intensity associated with a scale factor and/or window time. In a preferred embodiment, for a wavelet SPT, the n columns (e.g., n=30) represent an increasing sequence of window times for constant scale factor, and the m rows (e.g., m=129) represent a dyadic sequence of scale factors used to provide the spectrum for a given window time. Alternatively, the m rows may represent window times and the n columns may represent scale factors. A sequence of further operations is performed on the matrix, as discussed in the following, In step 43, the matrix entries (e.g., wavelet coefficients) are tessellated or decomposed into "cells," with each cell representing a grouping of adjacent matrix entries (e.g., a rectangular grouping of one or more sizes), where the entries in a given cell resemble each other according to one or more criteria and associated metric(s). A matrix may be divided into uniform size cells or may be divided according to statistical similarity of cell entries or according to another criterion.

As an example, consider the following 4×6 matrix $$M = \begin{vmatrix} 1 & 2 & 3 & 4 & 5 & 6 \\ 1 & 3 & 5 & 7 & 9 & 11 \\ 2 & 6 & 12 & 20 & 15 & 8 \\ 3 & 18 & 14 & 7 & 9 & 6 \end{vmatrix} \quad (3)$$

The matrix M may be expressed as a vector or single stream of data entries. If one decomposes this matrix M into four 2×3 non-overlapping rectangular groups of entries (cells), the corresponding arithmetic means of the four cells become $$<M> = \begin{vmatrix} 2.5 & 7 \\ 9.17 & 10.83 \end{vmatrix} \quad (4)$$

which can represent each of the four cells, and the corresponding standard deviations of the four cells become $$<\Delta M> = \begin{vmatrix} 42.75 & 291 \\ 628.97 & 117.36 \end{vmatrix} \quad (5)$$

Tessellation of the matrix entries into the four 2×3 non-overlapping groups of entries in this example may depend, for example, upon the relative sizes of the entries in the matrix M. More generally, each cell is represented by a "feature" associated therewith, which may be one or more associated numerical coefficient values, such as the entries in the matrix <M> shown in Eq. (4), or a maximum or minimum value from the cell entries.

In step 44, each cell representative value or feature in the tessellated matrix is optionally normalized by dividing this value by (i) a sum of all values of the cell representatives, (ii) a sum of the magnitudes of all values of the cell representatives, (iii) the largest magnitude of the cell representative values or (iv) another selected sum. Alternatively, a normalized cell representative value is formed as a difference between the cell representative value and a mean value for that population, divided by a standard deviation value for that population. Alternatively, a normalized cell representative value is formed as a difference between the cell representative value and a maximum or minimum cell representative value for the tessellated matrix. One goal of normalization is to reduce the dynamic range of the cell representative values for each instance r=1, . . . , R and each word q=1, . . . , Q.

In step 45, the (normalized) cell representative values determined in step 44 are arranged as a vector of length K=number of cells) or other suitable entity for subsequent processing.

In step 46, the vector entries $v_k(q;r)$ are received and processed by a neural net (NN) classifier by multiplying each vector entry $v_k(q;r)$ by a first set of weight coefficients $w_{1,k,h}(q;r)$ ($0 \leq w_{1,k,h} \leq 1$; k=1, . . . , K; h=1, . . . , H) and summing these weighted values to form $$S1(q;r)_h = \sum_k w_{1,k,h}(q;r) \cdot v_k(q;r) \quad (h=1,\ldots,H) \quad (6)$$

This process is repeated for each of the R spoken instances of the known word. Each of the weighted sums $S1(q;r)_h$ becomes an argument in a first activation function $A1\{S1(q;r)_h\}$, discussed in the following, also in step 46. Also in step 46, a second set of sums is formed $$S2(q;r)_g = \sum_h w_{2h,g}(q;r) \cdot A1\{S1(q;r)_h\}, \quad (g=1,\ldots,G) \quad (7)$$

which becomes an argument in a second activation function $A2\{S2(q;r)_g\}$.

In step 47, the system provides a set of reference values $\{A(q;ref)_g\}_g$ for the word number q and computes a set of differences $$\Delta 1(q) = (1/R \cdot G) \sum_{r,g} |A2\{S2(q;r)_g\} - A(q;ref)_g|^p \quad (8)$$

where p is a selected positive number. The system determines, in step 48, if $\Delta 1(q) \leq \epsilon(thr;1)$, where $\epsilon(thr; 1)$ is a selected threshold error, preferably in a range 0.01 and below.

Figure 5A:
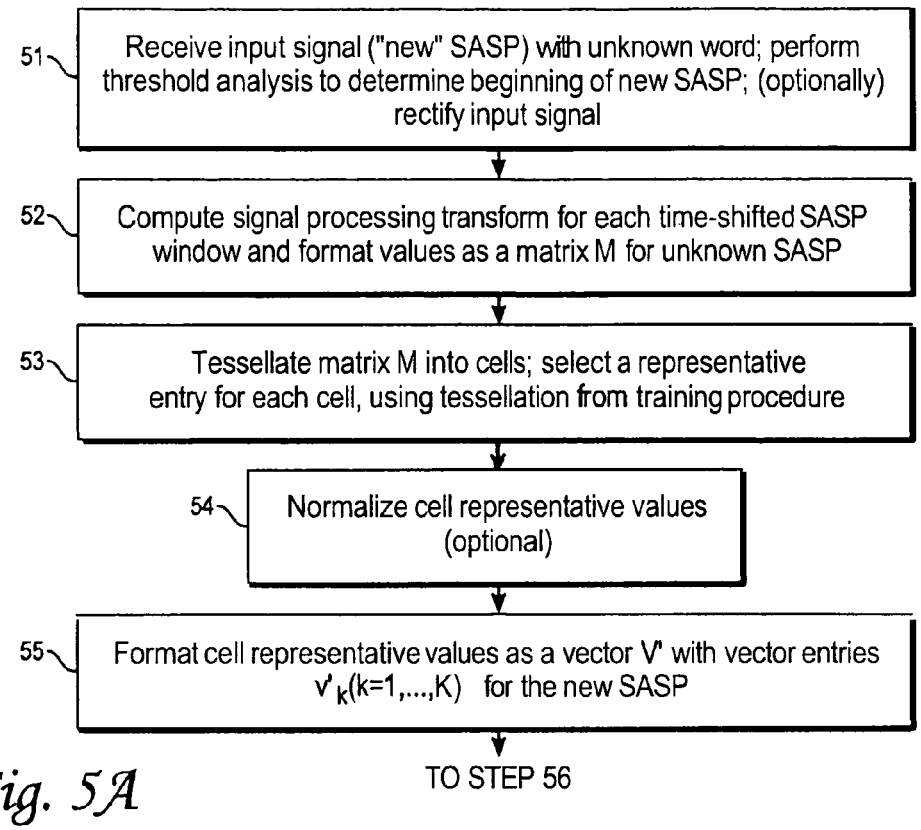
Figure 5B:
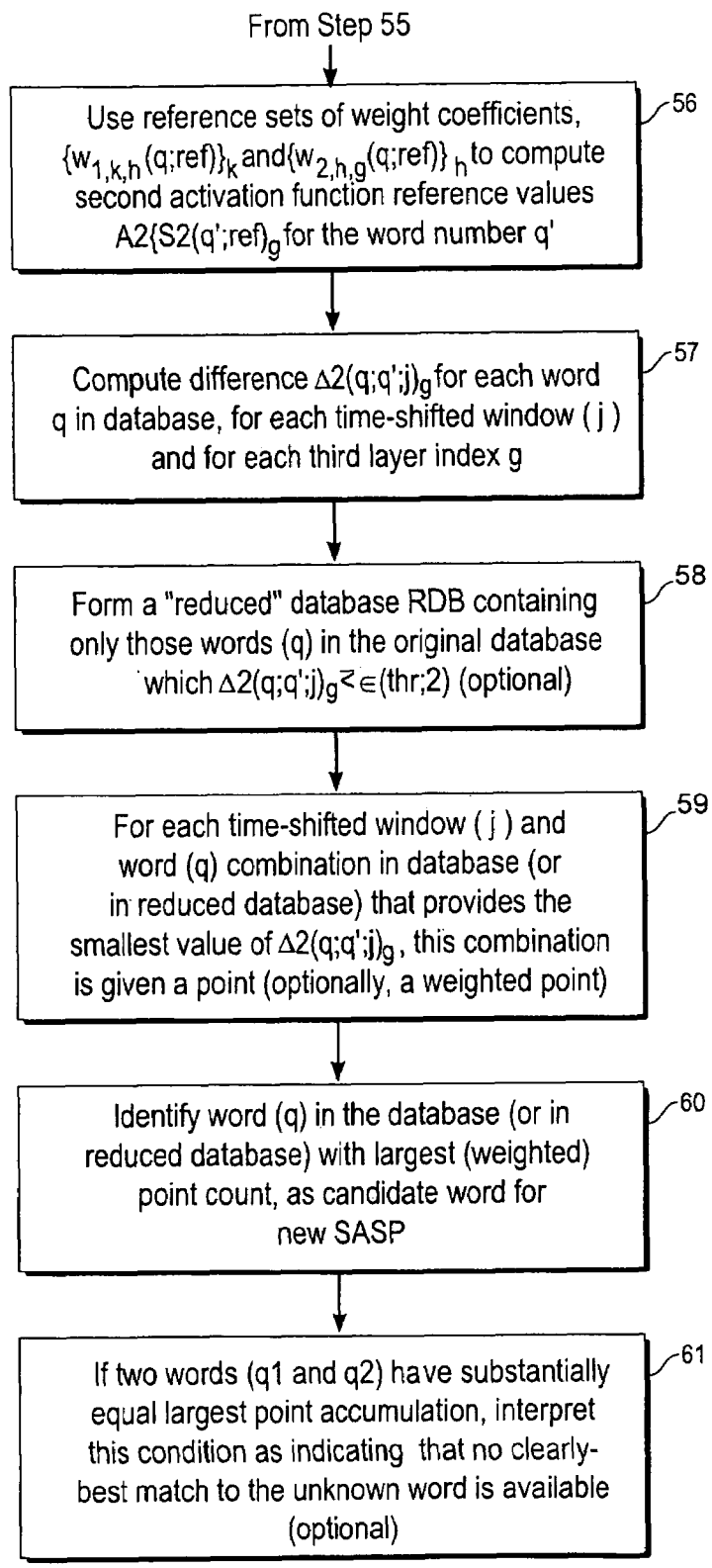

If the answer to the query in step 48 is "yes," the system accepts this estimated reference set, in step 49, for use in the word recognition procedure, illustrated in FIG. 5. If the answer to the query in step 48 is "no," the first and second weight coefficients, $w_{1,k,h}(q;r)$ and $w_{2,h,g}(q;r)$, are adjusted to provide another set of estimated reference values $A(q;ref)_g$, in step 50, using a neural net analysis approach, and steps 46-48 are repeated. In the neural net analysis, a gradient method is applied to a geometric space with coordinates $w_{1,k,h}(q;r)$ and $w_{2,h,g}(q;r)$, as discussed subsequently.

In the procedure illustrated in FIG. 4, two suitable activation functions are $$A\{S\} = \tan h(S) = \{\exp(a \cdot S) - \exp(-a \cdot S)\} / \{\exp(a \cdot S) + \exp(-a \cdot S)\}, \quad (9A)$$

$$A\{S\} = 1/\{1 - \exp(-a \cdot S)\}, \quad (9B)$$

having the respective ranges of $[-1,1]$ and $[0,1]$ for $-\infty < S < \infty$, where a is a selected positive number. Other monotonically increasing, finite range functions can also be used as activation functions.

For each word q, each reference value $A(q;ref)_g$ (q=1, . . . , Q) may be determined by different first reference sets of weight coefficients, $\{w_{1,k,h}(q;ref)\}_k$ and/or by different second reference sets of weight coefficients $\{w_{2,h,g}(q;ref)\}_h$ which are now fixed for the word number q. The reference values $A(q;ref)_g$ and the associated first and second reference sets of weight coefficients will henceforth be used for comparison with not-yet-identified SASP words. Optionally, the NN has F hidden layers and F+1 sets of weight coefficients ($F \geq 1$).

In an alternative embodiment, in steps 46-50, a first universal set of weight coefficients, $\{w_{1,k,h}(ref)\}_k$ and a second universal set of weight coefficients $\{w_{2,h,g}(ref)\}_h$, not dependent upon the particular word (q), replace the first and second sets of weight coefficients $\{w_{1,k,h}(q;ref)\}_k$ and $\{w_{2,h,g}(q;ref)\}_h$. In this alternative embodiment, where the database includes at least two words, the order of the instances of different (transformed) words must be randomized, and the neural network classifier seeks to identify first and second universal sets of weight coefficients, $\{w_{1,k,h}(ref)\}_k$ and $\{w_{2,h,g}(ref)\}_h$, that are accurate for all words in the database.

Word Recognition Procedure.

The word recognition procedure, according to one embodiment of the invention, includes the following actions: (1) receive a sub-audible EMG signal, representing an unknown word; (2) detect the beginning of an SASP, using a thresholding procedure; (3) create a window, having a selected length $\Delta t(win)$, that includes the SASP; (4) create a sequence of time-shifted windowed versions of the received SASP, with time shifts equal to a multiple of a time displacement value $\Delta t(displ)$; (5) apply a signal processing transform (SPT) to each of the time-shifted versions of the SASP; (6) form a matrix (which can be one-dimensional, a vector) from the SPT values for each of the time-shifted versions of the SASP; (7) tessellate the matrix into cells, with each cell represented by a cell "feature"; (8) (re)format the cell features as entries or components of a vector; (9) (optionally) normalize the vector entries; (10) receive the vector entries, for each time-shifted version of the SASP in a trained neural network classifier, and identify a word from a database that provides a best match to an activation function value corresponding to each time-shifted version of the SASP, (11) accumulate a point for each best match; and (12) identify a word, if any, with the highest point count as the best match to a word corresponding to the received SASP.

FIG. 5 is a high level flow chart of a word recognition procedure that uses the results of the training procedure shown in FIG. 4. In step 51, a sub-audible speech pattern (SASP) representing a sample of a "new" (unknown) word (referred to as number q') is received and optionally rectified. A sequence of sample values is received at the selected rate used in FIG. 4. A sample thresholding operation is performed to determine where, in the sequence, the sub-audible speech pattern (SASP) begins. A sequence of J time-shifted, partially overlapping windows, numbered j=1, ..., J (J≧2), is formed from the signal representing the new word, with consecutive start times displaced by multiples of a selected displacement time such as Δt(displ)=0–Δt(win)/2.

In step 52, an SPT operation is performed on the new SASP over the window length Δt(win), to provide a first spectrum for the new word for each of the windowed samples. In step 53, the matrix entries are tessellated or decomposed into the same cells that were used for each word in step 43 of FIG. 4. In step 54, each cell representative value or feature in the tessellated matrix is optionally normalized. In step 55, the cell representative values are arranged as a vector V' having vector entries $v'_k$ (k=1, ..., K) or other suitable entity for subsequent processing. In step 56, the first and second reference sets of weight coefficients, $\{w_{1,k,h}(q;ref)\}_k$ and $\{w_{2,h,g}(q;ref)\}_h$, (or $\{w_{1,k,h}(ref)\}_k$ and $\{w_{2,h,g}(ref)\}_h$) used to compute the activation function reference value $A2\{S2(q;ref)\}_g$ (or $A\{S(ref)\}_g$) for the word number q are used to compute an activation function $A2\{S2'(q';ref)\}_g$, as in Eq. (6).

In step 57, the system computes differences $$\Delta 2(q;q';j)_g = |A2\{S2'(q';j;ref)\}_g - A(q;ref)_g| \quad (10)$$

for each word (q) in the database, for each time shifted window (j) and for each NN third layer index g. Optionally, in step 58, only those words (q) in a "reduced" database RDB, for which $$\Delta 2(q;q';j)_g \leq \epsilon(thr;2) \quad (11)$$

is satisfied, are considered in accumulating points (in step 59), where $\epsilon(thr;2)$ is a selected second threshold error, preferably in a range 0.01 and below. Optionally $\epsilon(thr;1)=\epsilon(thr;2)$, but this is not required.

In step 59, for each time-shifted window (numbered j=1, ..., J), each word (q) in the database (or in the reduced database RDB) that provides the smallest value $\Delta 2(q;q';j)_g$ among the set of values computed in Eq. (11), is given one point or vote. In step 60, the word (q) in the database with the largest number of points is interpreted as the unknown word (q') that was received. Optionally, the point(s) accumulated according to the minimum value of $\Delta 2(q;q';j)_g$ can be weighted, for example, by multiplying the number 1 by a weight function $WF\{\Delta 2(q;q';j)_g\}$ that is monotonically decreasing as the argument $\Delta 2(q;q';j)_g$ increases. Two examples of suitable weighting functions are $$WF(s) = a + b \cdot ex\{-\alpha as\}, \quad (12A)$$

$$WF(s) = \{c - d \cdot (s)^\beta\}^e, \quad (12B)$$

where a, b, c, α and β and the product d·e are non-negative numbers, not all 0. If two or more words (e.g., q1 and q2) in the database have substantially the same largest point accumulation, the system optionally interprets this condition as indicating that no clearly-best match to the unknown word (q') is available, in step 61.

Figures 6, 7:
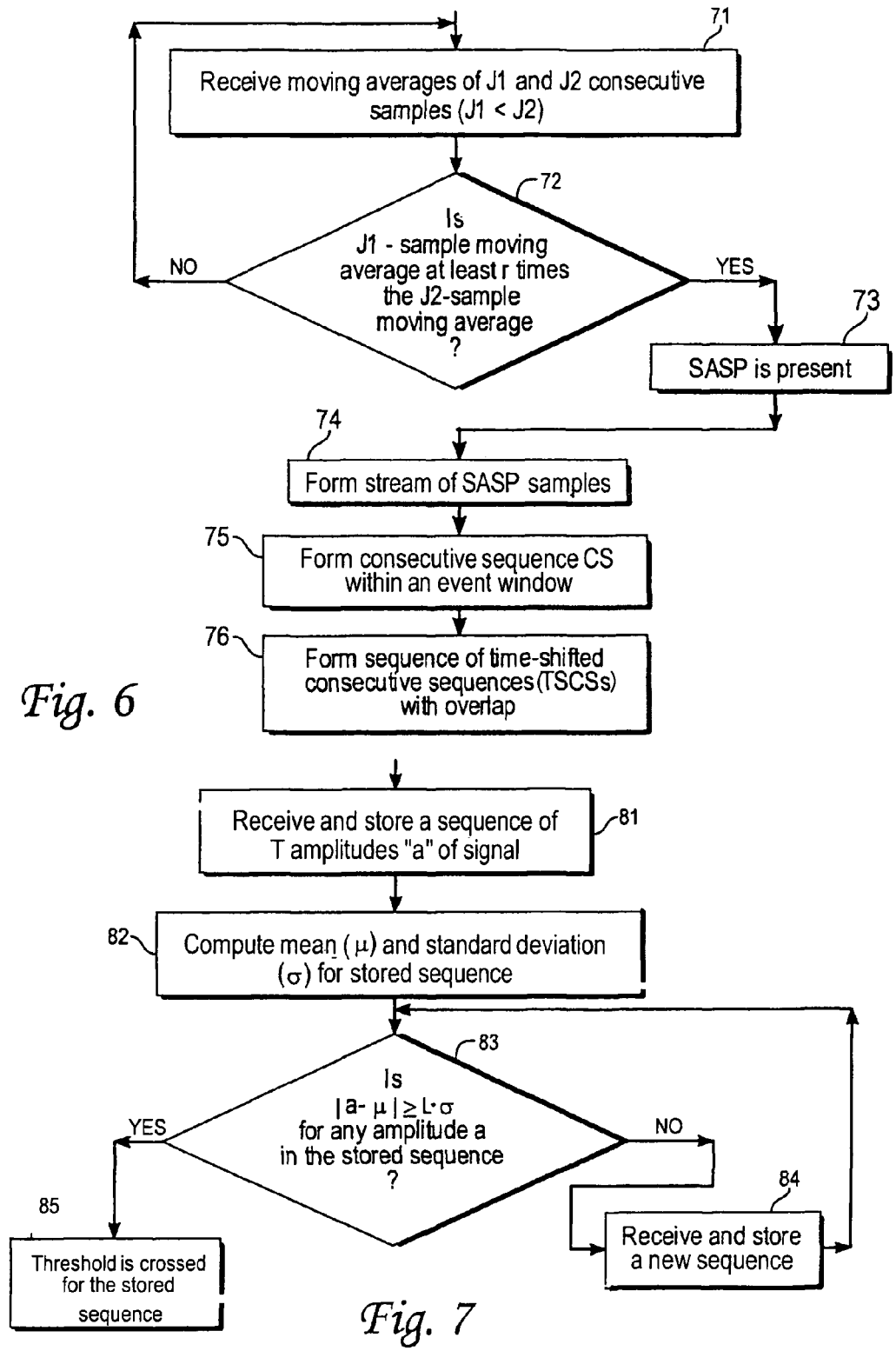

FIG. 6 sets forth in more detail a first embodiment for a thresholding operation for step 41 in FIG. 4. In step 71, two or more moving averages of consecutive sequences of H1 sampled values and H2 sampled values are formed (H1<H2), where, for example, H1=10 and H2=20 is a suitable choice. Initially, the sample amplitudes and both moving averages are substantially 0, except for the presence of noise. As the system encounters the beginning of a sub-audible speech pattern (SASP), the shorter H1-sample will rise before the longer H2-sample rises, when applied to consecutive sample runs with the same starting point. In step 72, the system determines if the moving average of the H1-samples is at least a multiple μ of the moving average of the H2-samples, where μ is a selected ratio ≧1. If the answer to the query in step 72 is "no," the system returns to step 71 and continues to receive samples and to form the two moving averages. If the answer to the query in step 72 is "yes," the system infers that an SASP is present and that an "SASP threshold" has been crossed; and the system begins to divide succeeding time intervals into epochs, in step 73. Other methods of determining when an SASP threshold has been crossed can also be used here.

In step 74 of FIG. 6, a set of signal samples is received, preferably as a stream of data, and the magnitude or absolute value of each SASP signal sample is formed (optional). In step 75, a consecutive sequence CS of the signal samples is formed within an event window, preferably of length Δt(win)=1-4 sec. In step 76 the system creates a new sequence TSCS of time shifted consecutive sequences, with the beginning of each TSCS being shifted by a selected time delay amount Δt(displ) relative to the immediately preceding TSCS. Each TSCS will be processed and classified by a neural network classifier. The number of (above-threshold, consecutive) TSCSs may be used as a parameter in the comparisons in FIG. 4. The system then proceeds to step 42 of FIG. 4 and continues.

FIG. 7 illustrates a dynamic threshold adjustment procedure, relying in one implementation on a Bollinger band, that may be used in step 41. In step 81, a sequence of T amplitudes "a" of the signal are received and stored. In step 82, a mean (μ) and standard deviation (σ) are computed for the stored sequence. In step 83, the system determines if the magnitude of the difference |u–μ| is at least equal to L·σ for at least one amplitude u in the stored sequence, where L is a selected positive number (e.g., L=4-10). If the answer to the query in step 83 is "no", the system replaces the stored sequence by a new sequence (e.g., shifted by one sample value), in step 84, and returns to step 82; no threshold has yet been crossed in this situation. If the answer to the query in step 83 is "yes", a threshold has been crossed within the stored sequence and a position representing the beginning of the word can be identified, in step 85.

Figure 8:
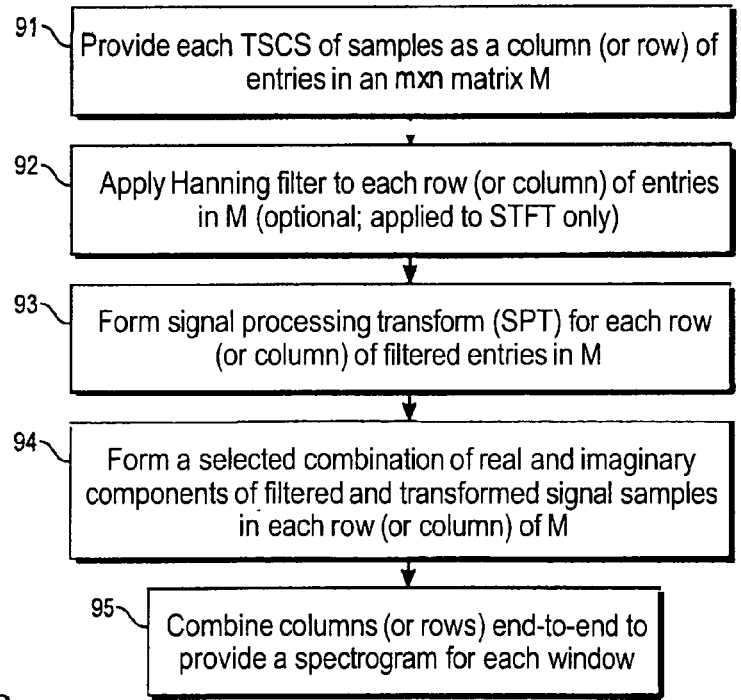
FIGS. 6-10 are flow charts of intermediate procedures associated with the steps in the FIG. 4 or FIG. 5 flow chart.

FIG. 8 is a flow chart providing more detail on step 42 in FIG. 4, where a Fourier transform is used for the SPT operation In step 91, the data stream is optionally reformatted into a sequence of columns (or into rows) of signal samples, with each column (or row) corresponding to a TSCS, according to the format required for computer analysis. In step 92, a Hanning filter is optionally applied to each STFT window. In step 93, an SPT operation is performed for each row of (filtered) signal samples. The particular SPT used may be a conventional Fourier transform (applied to a window of finite width), a dual wave tree wavelet transform, a Daubechie transform, a Hartley transform, a moving average with uniform or non-uniform weights, or similar transforms. The particular choice will depend upon the known characteristics of the data received for analysis. Preferably, the SPT of the signal sample sequences will provide real and imaginary components that can be combined and processed as appropriate. In step 94, the system forms a selected combination of real and imaginary components of the (filtered and transformed) signal samples in each row. In step 85, the columns (or rows) are combined, end-to-end, to provide a spectrogram for each (time-overlapped) window.

Figure 9:
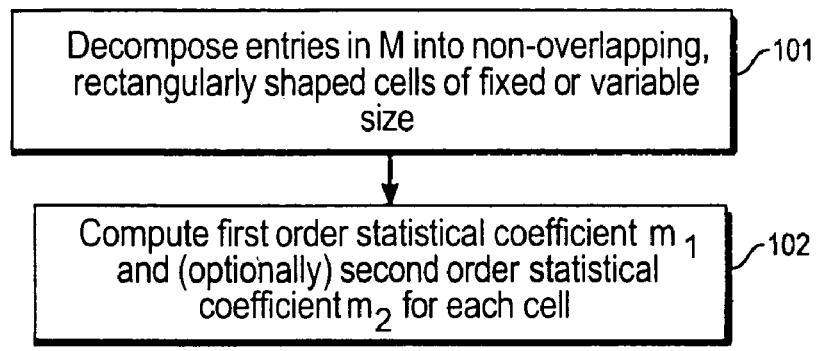

FIG. 9 is a flow chart providing more detail on step 43 in FIG. 4, according to a first embodiment for tessellation of the matrix M. In step 101, the entries within the matrix M are decomposed into non-overlapping, rectangularly-shaped cells of one or more selected sizes (e.g., 2×3 or 5×5 or 10×7)

so that every entry belongs to precisely one cell. Cells adjacent to a boundary of the matrix M may have a different (residual) size. In step 102, a first order statistical coefficient $m_1$ (e.g., arithmetic mean, median, mode or largest value) is computed for, and associated with, each cell, representing an average magnitude or other feature for the entries within the cell. A second order statistical coefficient $m_2$ (e.g., standard deviation) is optionally computed for each cell. Here, the individual values within each cell may be substantially different so that the first order coefficient $m_1$ associated with a given cell may not be very representative of the individual entries. However, the cells in this embodiment are of fixed size, which is useful in some of the following computations. At one extreme, each cell may be a single entry in the matrix M.

Figure 10:
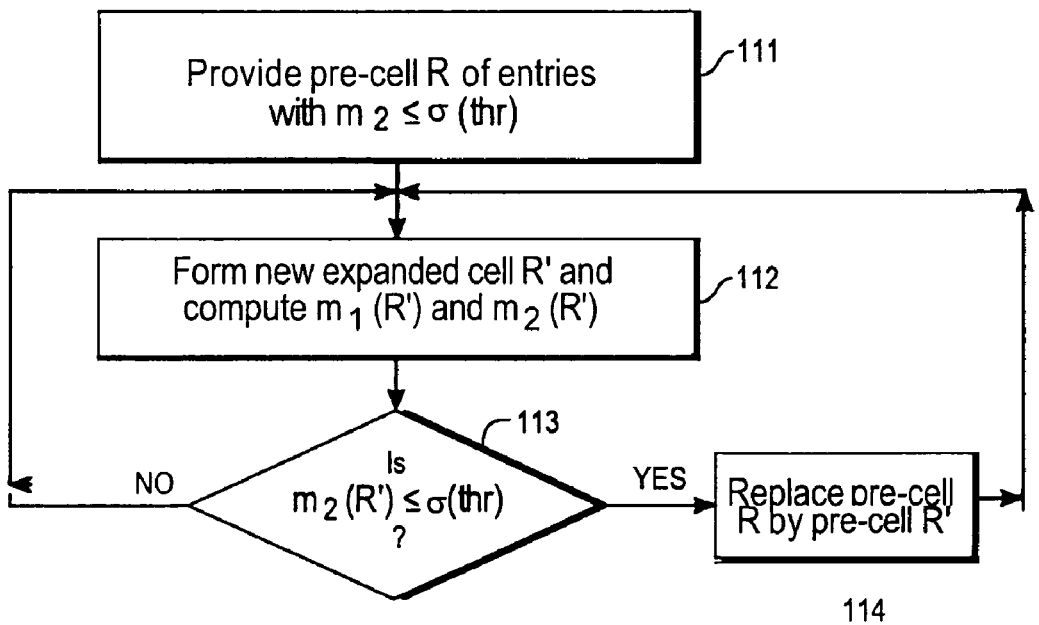

FIG. 10 is a flow chart of an alternative embodiment for tessellation of the matrix M (step 43 in FIG. 4). In step 111, the matrix entries are tentatively aggregated into "pre-cells," with each pre-cell initially being a single entry and having a second order statistical coefficient $m_2$ of 0. Consider a general pre-cell, such as a rectangular set E of entries, having a selected first order statistical coefficient $m_1$ (arithmetic mean or median or mode) and having a second order statistical coefficient $m_2$ no larger than a selected positive threshold value $\sigma(thr)$. In step 112, an expanded pre-cell set E', having one more row or one more column than E, is formed, and statistical coefficients $m_1(E')$ and $m_2(E')$ are computed for this pre-cell E'. In step 113, $m_2(E')$ is compared with the threshold value $\sigma(thr)$. If the coefficient $m_2(E')$ for the expanded set E' is no larger than the threshold value $\sigma(thr)$, the pre-cell is redefined, in step 114, to include the expanded set E', and the system returns to step 112. The redefined set E' is further expanded in step 115 by one row or one column to form a new set E", and the system returns to step 112. If $m_2(E')$ is larger than the threshold $\sigma(thr)$, the expanded set E' is rejected, the pre-cell includes the set E but not this particular expanded set E', and the system returns to step 112. However, another expanded set can be formed from E, by adding a different row or column, and the coefficient $m_2$ for this new expanded set can be computed and compared with $o(thr)$. At some level, the system identifies a rectangular or other shape set $E^{\wedge}$ of maximum size whose coefficient $m_2(E^{\wedge})$ is no larger than the threshold value $\sigma(thr)$, and this maximum size set becomes a cell. This process is repeated until every entry in a cell is "similar" to every other entry in that cell, as measured by the threshold value $\sigma(thr)$. The number of matrix entries has been reduced to a smaller number of cells. The cells may be rectangular but do not necessarily have the same size. In this approach, the entries in a cell are represented by the coefficient $m_1$ for that cell, but the cell size is determined by the adjacent entries for which $m_2(E') \leq \sigma(thr)$ so that the entries may be more "similar" to each other.

One practical approach for neural network training is back-propagation of errors, together with conjugate gradient analysis to identify global minima. This approach is discussed, for example, by T. Masters in *Practical Neural Network Recipes in C++*, Morgan Kaufman Publ., 1993, pp. 102-111.

With reference to step 50 in FIG. 4 in the preceding, a conjugate gradient algorithm with trust region (to limit the extension in any direction in coordinate space) is applied to the error term sum, $\epsilon(q)$ with q fixed, to determine an extremum point (minimum) for the received cell representatives. For example, the basic Fletcher-Reeves algorithm can be utilized, wherein a direction of steepest descent $$p_0 = -g_0 \qquad (13)$$

for the surface or function is first identified; a line search is performed to estimate the optimal distance to be moved along the current search direction $(p_k)$ $$x_{k+1} = x_k + \alpha_k p_k; \qquad (14)$$

and a conjugate direction $$p_k = g_k + \beta_k p_{k-1} \qquad (15)$$

is determined for the new search direction. For the Fletcher-Reeves update, the parameter $\beta_k$ is chosen according to $$\beta_k = g_k \cdot g_k / \{g_{k-1} \cdot g_{k-1}\}. \qquad (16)$$

For the Polak-Ribiere update, the parameter $\beta_k$ is chosen according to $$\beta_k = \Delta g_{k-1} \cdot g_k / \{g_{k-1} \cdot g_{k-1}\}, \qquad (17)$$

where $\Delta g_{k-1} = g_{k-1} - g_{k-2}$ is the preceding change in the direction of steepest descent. In any conjugate gradient approach, it is preferable to periodically reset the search direction to the steepest descent gradient. In a particular approach developed by Powell and Beale, resetting occurs when little orthogonality remains between the present gradient and the preceding gradient; the corresponding test is whether the inequality $$|g_{k-1} \cdot g_k| \geq 0.2 |g_k|^2. \qquad (18)$$

is satisfied. Other variations on the corresponding algorithms can also be used here.

Application to Communications in an Interfering Environment

*The sub-audible signal processing system disclosed herein can be applied to communication in an interfering environment, for example, an emergency service worker (ESW) working in an extreme environment (e.g., filled with smoke or toxic fumes) in which reliable and accurate communication is more important than high throughput or use of a lexicon having a large number of words. The system disclosed herein has been applied to the following group of 20 "words" (including individual words and short phrases) that an ESW might use in responding to an emergency event.

*Table 1 sets forth the accuracies determined for one person pronouncing each of 21 words and phrases many times, including a sub-list of 6 words and phrases ("evacuate," "Mayday," "mantrap," fire safe," "fire clear," "zero" and "one") that were pronounced 30 times each, while wearing a self contained breathing apparatus ("SCBA") that is customarily worn by a first responder ESW at an emergency event. The accuracies associated with the six words in the sub-list (e.g., "Mayday," "zero" and "one") are lower (63, 70 and 80 percent) than the remainder, but the range of accuracies for all words in the original list is 53-100 percent. The accuracy of word recognition for an ESW who is not wearing an SCBA should be substantially higher in most situations

TABLE 1

Accuracies Associated With Particular EMG Signals.

| | |
|---|---|
| evacuate | (97%) |
| Mayday | (80%) |
| fire safe | (93%) |
| mantrap | (97%) |
| stop | (84%) |
| go | (100%) |
| left | (91%) |
| right | (80%) |
| alpha | (97%) |

TABLE 1-continued

Accuracies Associated With Particular EMG Signals.

| | |
|---|---|
| omega | (97%) |
| zero | (63%) |
| one | (70%) |
| two | (53%) |
| three | (78%) |
| four | (85%) |
| five | (75%) |
| six | (78%) |
| seven | (75%) |
| eight | (80%) |
| nine | (63%) |

The words "alpha" and "omega" can be used for other commands, such as "up" and "down," for example. The particular set of words and phrases used is not critical, although the recognition accuracies may vary with the particular words and phrases used.

Figure 11:
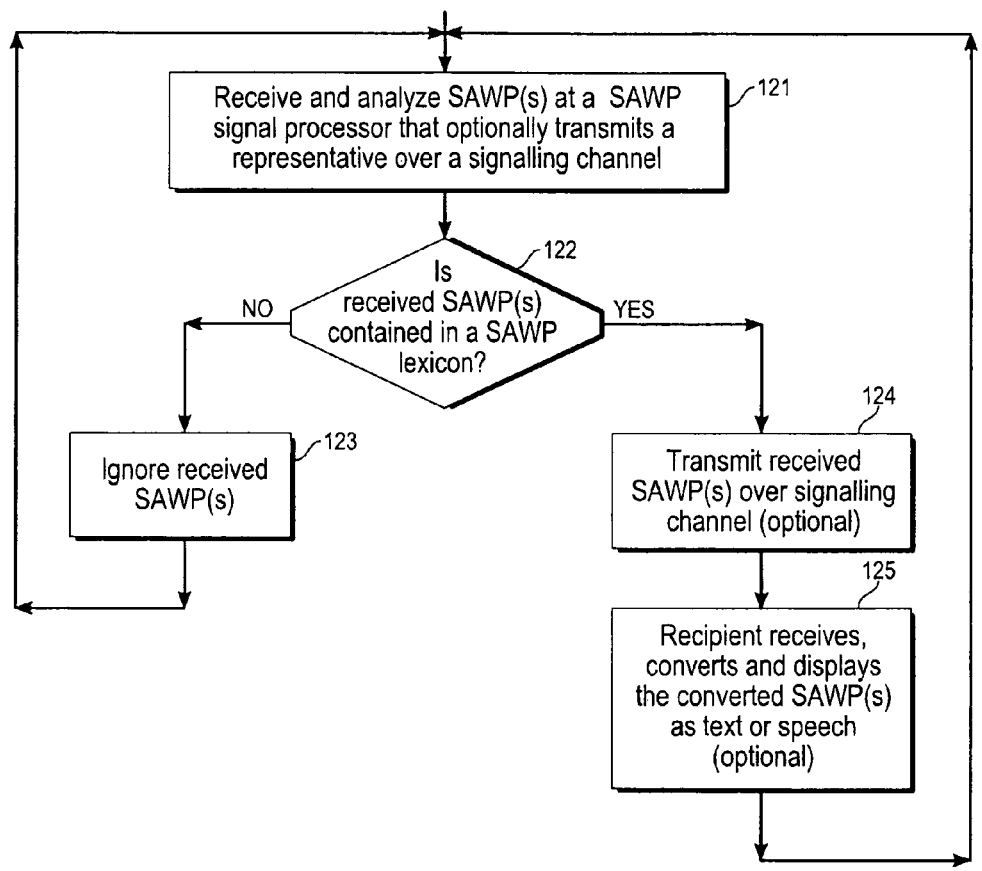
*FIG. 11 is a flow chart of a procedure for practicing the invention.

*FIG. 11 is a flow chart of a procedure for practicing an embodiment of the invention. In step 121, a sub-audible word or phrase ("SAWP"), or a collection of SAWPs, is received and analyzed at a SAWP signal processor that processes and transmits a representation of a SAWP over a (wireless or wired) signaling channel to at least one recipient. In step 122, the system determines if the SAWP is a word or phrase in a SAWP lexicon associated with the module. If the answer to the query in step 122 is "no," the system optionally ignores the SAWP and takes no further action, in step 123, and returns to step 121. If the answer to the query in step 122 is "yes," the system transmits a SAWP signal representing the received SAWP over the transmission channel, in step 124, optionally using encoded, encrypted or otherwise transformed signals. In step 125, the recipient receives the SAWP signal and converts and displays the received SAWP signal in at least one of visually perceptible alphanumeric text, audibly perceptible speech, and a coded signal representing the received SAWP, and optionally returns to step 121.

Figure 12:
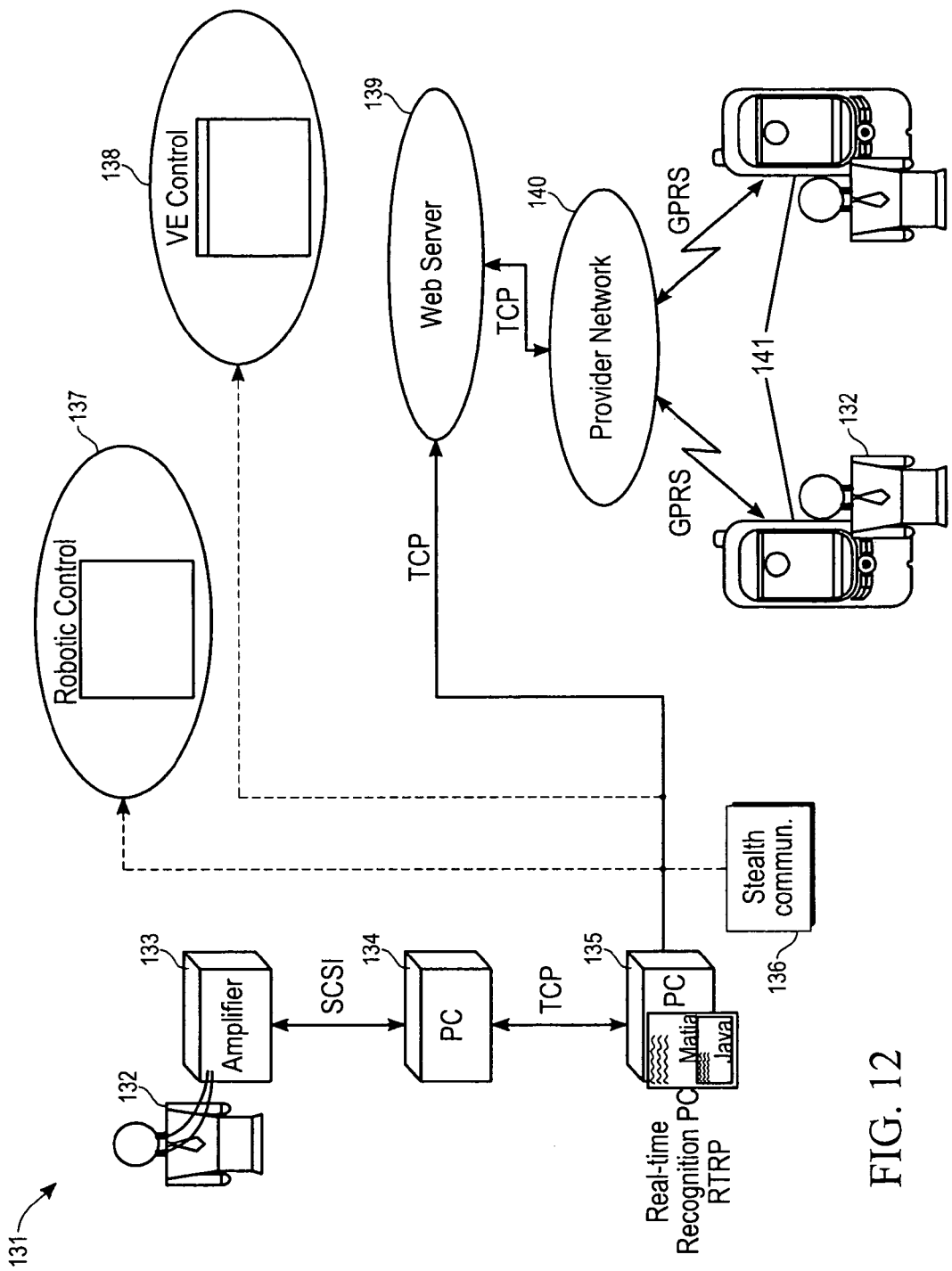
*FIG. 12 schematically illustrates an embodiment of the invention.

*As a proof of feasibility, a wireless system 131 is illustrated in FIG. 12, including a receiver that functions as a conventional cell phone, has been programmed to receive and analyze sub-audible sounds representing a subset of the 21 words set forth above and to visually display and audibly display each word from this list that is recognized, for a given speaker 132. The system 131 includes: an initial receiver-amplifier 133 that receives and amplifies EMG signals from the speaker 132; an initial signal processor 134 that receives the amplified EMG signal(s) from the amplifier 133, processes this signal, and provides the processed signal for a real time SAWP recognition processor("RTRP") 135 (which may be part of the initial signal processor 134. The RTRP 135 optionally transmits its output signals to a stealth communications module 136, to a robotic control module 137, to a VE control module 138, to a Web server 139 and/or to a service provider network 140 that optionally serves one or more cell radio units 141, using general packet cell radio standards (GPRS).

*For example, a Web server or other communication module 139 that receives the processed sub-audible message (representing a SAWP); an end receiver and network 140 (e.g., a conventional or suitably modified cell phone) that a signal representing the sub-audible message from the server 139. A recipient (not explicitly shown) holds or controls the GPRS unit 140 and receives the ultimate signal in visually perceptible and/or audibly perceptible format.

*If a sub-audible word or phrase (or its EMG equivalent) is recognized from a lexicon maintained by the RTRP 135, this word or phrase is optionally presented to the recipient in visually and/or audibly perceptible format by the RTRP 135. If the sub-audible word or phrase is not recognized by the initial signal processor 134 from the lexicon, this word or phrase is optionally presented to the recipient (not explicitly shown) in visually perceptible alphanumeric text, or the word or phrase is indicated to be non-understandable. The accuracy percentage varies from one word to another but generally lies in a range 87-97 percent.

*In the system 131 illustrated in FIG. 12, a cell phone user 132 is connected to a Synamp amplifier 133 using Ag/Agl electrodes. Sub-audible speech processing software, including Java client software customized for sub-audible speech, as discussed in the preceding, is activated on a portable PC or other signal processor(s) 134, 135 connected to receive and process amplified EMG signals for transmission through a USB link and Web server 139 to the end receiver 141 (e.g., a cell phone). Various background sounds are turned on, including turn-on of a diesel fire engine with an operative water pump, a high speed rescue saw and various sirens.

*The user may wear a self contained breathing apparatus ("SCBA") suit with turnout, and the suit may be closed and pressurized. The cell phone within the suit is activated, and the cell phone menu is transformed to reflect a sub-audible menu of options (e.g., SAWPs). The user forms a sequence of sub-audible words and phrases {e.g., "fire safe," "mantrap," "evacuate," "Mayday," "stop," "go"}, for pickup by the PC, which delivers the processed sub-audible signals to a cell phone system. The cell phone system checks to determine if the sub-audible word or phrase is recognized among the set of previously trained words and phrases. If the word or phrase is not recognized, this SAWP is ignored. If the SAWP is recognized, the cell phone displays the word or phrase on the screen and optionally pronounces this in a pre-recorded voice. The percentage of correct recognition for this set of words and phrases is presently estimated at about 80-97 percent. The lower end of this percentage range is expected to rise with increasing familiarity with use of the system. This exemplifies use of the invention over a wireless channel.

*In a first variation on the preceding approach, the USB link between PC and cell phone is removed, and the processed sub-audible signals are sent by wireless transmission to any phone capable of downloading a Java applet.

*In a second variation, the word/phrase set is changed to {"stop," "go," "left," "right," "forward" and "back"} and the processed sub-audible signals are sent by wireless transmission to a PER robot. Communication of these six words is used to issue command/control signals for robot operations and/or motion.

*This approach can be used to facilitate communication between: (1) two or more emergency service workers in a noisy, toxic, smoky or other signal-interfering environment; (2) two or more first responders in a hazardous substance environment, where one or both are wearing a self contained breathing apparatus (SCBA); (3) two or more workers in an underwater environment who need to communicate directly (visually and/or audibly), where one or more workers is wearing a SCBA apparatus; (4) two or more workers in a continuously or sporadically noisy environment, to avoid or minimize the necessity of repeating a command or observation or other information message; and (5) minimizing environmental damage to, or interference with, electronic communications mechanisms. In a situation involving workers concerned with a particular activity, the number of SAWPs used for specialized communication can be relatively small (e.g., 20-40). Alternatively, a first subset of the words or phrases for which SAWPs are provided and processed can be replaced by a second subset of encoded, encrypted, transformed or other symbolic or representational SAWPs ("R-SAWPs") than are the SAWPs in the first subset.

*In certain self-contained systems, such as an SCBA or an underwater diving suit, moisture from a worker's breath may accumulate to levels that interfere with normal audible speech, through creation of resonances or other distortion mechanisms that mask or otherwise change the perceived meaning of words and/or phrases. Issuance and transmission of a SAWP does not depend, or depends only weakly upon, voice-carrying characteristics that are associated with or determined by standard speech. For example, issuance, transmission, receipt and analysis of a SAWP is not affected by presence of a low level "swish" sound associated with expulsion of moist air or oxygen-depleted air (e.g., with high $CO_2$ content) from a self-contained suit. Issuance, transmission, receipt and analysis of a SAWP is also not affected by presence of environmentally hazardous substances, such as toxic, reactive, ignitable, corrosive or poisonous gases that otherwise might limit use of standard speech because of concern for exposure of the speaker's organs or concern for degraded performance of electronic components. Issuance, transmission, receipt and analysis of a SAWP is also not affected by presence of high frequency or variable frequency noise or electromagnetically varying signals, if at least one frequency range can be found where the magnitude of the interfering signal(s) can be minimized.

What is claimed is:

1. A method for communicating information in an environment that interferes with audible speech, the method comprising:
  choosing at least a first sub-audible word or phrase (SAWP) and a second SAWP to be first and second representational SAWPs (Rep-SAWPs), respectively, where each Rep-SAWP is chosen to provide optimal likelihood of recognition of the transmitted SAWP signal in an ambient environment,
  receiving at least one SAWP, from among the first SAWP and the second SAWP, at a wireless signaling module that processes and transmits sub-audible speech signals over a signaling channel to at least one recipient module;
  determining if the at least one SAWP is a word or phrase in a SAWP lexicon associated with the module; and
  when the at least one SAWP is recognized as belonging to the SAWP lexicon:
    (i) transmitting the least one SAWP representing the received SAWP over the signaling channel; and
    (ii) receiving the at least one SAWP from the signaling channel at the recipient module and converting the received at least one SAWP to at least one of visually perceptible alphanumeric text, audibly perceptible speech, and a coded signal representing the SAWP.

2. The method of claim 1, further comprising including in said SAWP lexicon at least one of the following words and phrases: "evacuate," "Mayday," "mantrap," "fire safe," "stop," "go," "left," "right," "alpha," "omega," "zero," "one," "two," "three," "four," "five," "six," "seven," "eight," and "nine."

3. The method of claim 1, further comprising choosing at least one of said first and second Rep-SAWPs to be at least one of an encoded SAWP, an encrypted SAWP and a SAWP that is transformed to a format that resists signal degradation when transmitted in said ambient environment.

4. The method of claim 1, wherein said process of determining if said at least one SAWP is a word or phrase in a SAWP lexicon associated with said module comprises:
  receiving R signal sequences associated with said at least one SAWP, with each sequence including an instance of a sub-audible speech pattern (SASP), numbered $r=1, \ldots, R$ with $R \geq 2$, and each SASP including at least one word drawn from a selected database of Q words, numbered $q=1, \ldots, Q$ with $Q \geq 2$;
  estimating where each of the R SASPs begins in the sequences;
  for each of the signal sequences, numbered $r=1, \ldots, R$:
    providing signal values of the received signal, number r, within a temporal window having a selected window width $\Delta t(win)$;
    transforming each of the R SASPs, using an Signal Processing Transform (SPT) operation that is expressed in terms of at least one transform parameter having a selected sequence of parameter values;
    providing a matrix M with entries equal to the SPTs for the R SASPs, ordered according to the at least one transform parameter along a first matrix axis;
    tessellating the matrix M into a sequence of exhaustive and mutually exclusive cells, with each cell containing a collection of contiguous matrix entries, where each cell is characterized according to at least one selected cell criterion;
    providing, for each cell, a cell representative value ("feature"), depending upon at least one of the matrix entries within the cell;
    organizing the features into a vector V with entry values $v_k$ ($k=1, \ldots, K$), where K is the number of features for the tessellated matrix M; and
    analyzing the entry values $v_k$, using a neural net classifier, a selected neural net architecture, and a sequence of estimated weight coefficient values associated with at least one of the neural net classifier layers, where the neural net classifier provides a sequence of output values dependent upon the weight coefficient values and upon at least one of the entry values $v_k$;
  providing a sequence of target output values $A(q;ref)_g$, one for each word number q, for the neural net classifier output values; and
  adjusting the weight coefficient values to provide a reference set of weight coefficient values for which the neural net classifier output values for the R SASPs and for each of the Q words agree with the target output values within a selected threshold error number $\epsilon(thr;1)$.

5. The method of claim 4, further comprising replacing at least one of said features by a normalized feature for at least one of said cells corresponding to said matrix M.

6. The method of claim 4, wherein said process of adjusting said weight coefficient values comprises:
  providing a first sequence of estimated weight coefficients $\{w_{1,k,h}\}$ and a second sequence of estimated weight coefficients $\{w_{1,h,g}\}$ ($k=1, \ldots, K$; $h=1, \ldots, H$; $g=1, \ldots, G$), for first and second layers, respectively, of said neural net classifier;
  forming a first sum $S1(q;r)_h$ of products of said entry values $v_k$ and corresponding weight coefficients $w_{1,k,h}$;
  computing a first activation function $A1\{S1(q;r)_h\}$ applied to the sum $S1(q;r)_h$ as argument;
  forming a second sum $S2(q;r)_g$ of products of the first activation function values $A1\{S1(q;r)_h\}$ and corresponding weight coefficients $w_{2,h,g}$;
  computing a second activation function $A2\{S2(q;r)_g\}$ applied to the sum $S2(q;r)_g$ as argument;

adjusting the first and second weight coefficient sequences to obtain a first reference set $\{w_{1,k,h}(q;\text{ref})\}_k$ and a second reference set $\{w_{2,h,g}(q;\text{ref})\}_h$ of the weight coefficients, associated with said at least one word number q, for which, for each of said instances R, a difference between the activation function value $A2\{S2(q;r)_g\}$ for said instance r and said target output values $A(q;\text{ref})_g$, computed using the reference set of weight coefficients, has a magnitude that is no greater than said selected positive error threshold number $\epsilon(\text{thr};1)$.

7. The method of claim 6, further comprising:
receiving a new SASP containing an unknown word, referred to as a "new" word, number q';
estimating where the new SASP begins;
providing signal values of the received signal for the new SASP within each of said J temporal windows, numbered j=1, ..., J with J>2, that are shifted in time relative to each other by multiples of a selected displacement time $\Delta t(\text{displ})$;
for the signal values within each of the time-shifted windows, numbered j=1, ..., J:
  transforming each of the signal values of the new SASP, using said Signal Processing Transform operation;
  providing a matrix M' with entries equal to said SPTs, ordered according to said at least one transform parameter along a first matrix axis;
  tessellating the matrix M' into said sequence of exhaustive and mutually exclusive cells that correspond to said cells for said tessellated matrix M;
  providing, for each cell in the matrix M', a cell representative value or "feature", depending upon at least one of the matrix entries within the cell; and
  organizing the features into a vector V' with entry values $v'_k$ (k=1, ..., K);
applying said neural net classifier and said reference set of said weight coefficients to compute said neural net classifier output values for each of the time-shifted sequences of the new SASP;
forming comparison differences between said neural net classifier target output values and said neural net classifier output values for each of the time-shifted sequences of the new SASP;
for each of said time shifted sequences of the new SASP, choosing at least one word, number q", in said database for which the magnitude of the comparison difference is no greater than a magnitude of the comparison difference for any other word in said database, and accumulating a weighted point each time the at least one word number q" is chosen; and
when the at least one word number q" has a higher number of weighted points than the number of weighted points for any other word in said database, interpreting this condition as indicating that the new SASP includes the word number q".

8. The method of claim 7, further comprising replacing at least one of said features for said matrix M' by a normalized feature for at least one of said cells for said matrix M'.

9. The method of claim 7, further comprising:
when at least two distinct words, number q1 and q2, in said database have substantially equal numbers of said weighted points and the substantially equal numbers of said weighted points of the at least two words, number q1 and q2, are substantially greater than said number of said weighted points of any other word in said database, interpreting this condition as indicating that said new word included in said new SASP cannot be unambiguously identified.

10. The method of claim 7, further comprising choosing said weighting for said weighted points from the group of weighting formats consisting of (1) substantially uniform weighting and (ii) a weighting that decreases monotonically as said magnitude of said comparison difference increases.

11. The method of claim 7, wherein said steps of applying said neural net classifier and forming said comparison differences comprise:
forming a sum $S1'(q';j;\text{ref})_h$ over said index k of a product of said first reference set of weight coefficient $w_{1,k,h}(q';j;\text{ref})$ and said vector entries $v'_k$, and computing an activation function value $A1\{S1'(q';j;\text{ref})_h\}$ depending upon the sum $S1'(q';j;\text{ref})_h$;
forming a sum $S2'(q';j;\text{ref})_g$ over said index h of a product of said second reference set of weight coefficient $w_{2,h,g}(q';j;\text{ref})$ and the activation function values $A1\{S1'(q';j;\text{ref})_h\}$ and computing an activation function value $A2\{S2'(q';j;\text{ref})_g\}$ depending upon the sum $S2'(q';j;\text{ref})_g\}$; and
forming a comparison difference between the activation function value $A2\{S2'(q';j;\text{ref})_g\}$ for the new SASP and said target output value $A(q;\text{ref})_g$ for at least one of said words, number q, in said database.

12. The method of claim 4, further comprising determining said reference set of said weight coefficients to be independent of said word number q in said database.

13. The method of claim 4, further comprising determining said reference set of said weight coefficients so that at least one reference set weight coefficient for a first selected word number q1 in said database differs from a corresponding reference set weight coefficient for a second selected word number q2 in said database.

14. The method of claim 4, further comprising selecting said window width $\Delta t(\text{win})$ in a range 1-4 sec.

15. The method of claim 4, further comprising selecting each of said matrix cells to be rectangularly shaped.

16. The method of claim 15, further comprising selecting at least two of said matrix cells to have different sizes.

17. The method of claim 4, further comprising determining said matrix cells by at least one of a first order statistical coefficient and a second order statistical coefficient for said entries in that cell.

18. The method of claim 17, further comprising:
selecting said first order and said second order statistical coefficients to be a statistical mean μ and a standard deviation σ, respectively for a cell; and
including in at least one of said cells a collection of contiguous entry values u of said matrix for which a normalized difference $|u-\mu|/\sigma$ is no greater than a selected positive number.

19. The method of claim 4, further comprising choosing said SPT operations from the group of SPT operations consisting of (i) a windowed short time interval Fourier Transform (STFT); (ii) discrete wavelets (DWTs) and continuous wavelets (CWTs) using Daubechies 5 and 7 bases; (iii) dual tree wavelets (DTWTs) with a near_sym_a 5,7 tap filter and a Q-shift 14,14 tap filter; (iv) Hartley Transform; (v) Linear Predictive Coding (LPC) coefficients; (vi) a moving average of a selected number of said sample values with uniform weighting; and (vii) a moving average of a selected number of said sample values with non-uniform weighting.

20. The method of claim 4, further comprising selecting said database to include at least one of the words "stop", "go", "left", "right", "alpha", "omega", "one", "two", "three", "four", "five", "six", "seven", "eight", "nine" and "ten."

21. The method of claim 4, further comprising selecting said error threshold number to lie in a range $\epsilon(\text{thr};1) \leqq 0.01$.

22. The method of claim 4, further comprising applying a back propagation of error method in said neural net classifier analysis of said features of said cells of said matrix M.

23. The method of claim 4, further comprising:
receiving a new SASP signal containing an unknown word, referred to as a "new" word, number q';
estimating where a new SASP begins in the new SASP signal;
providing signal values of the received new signal for the new SASP within each of said J temporal windows, numbered j=1, ..., J with J≧2, that are shifted in time relative to each other by selected multiples of a selected displacement time Δt(displ);
for the signal values within each of the time-shifted windows, numbered j=1, ..., J:
transforming each of the signal values of the new SASP, using said Signal Processing Transform operation;
providing a matrix M' with entries equal to said SPTs, ordered according to said at least one transform parameter along a first matrix axis;
tessellating the matrix M' into said sequence of exhaustive and mutually exclusive cells that correspond to said cells for said tessellated matrix M;
providing, for each cell in the matrix M', a cell representative value or "feature", depending upon at least one of the matrix entries within the cell; and
organizing the features into a vector V' with entry values $v'_k$ (k=1, ..., K);
applying said neural net classifier and said reference set of said weight coefficients to compute said neural net classifier output values for each of the time-shifted sequences of the new SASP;
forming said comparison differences between said neural net classifier target output values and said neural net classifier output values for each of the time-shifted sequences of the new SASP;
for each of said time shifted sequences of the new SASP, choosing at least one word, number q", in said database for which (i) the magnitude of the comparison difference is no greater than the comparison difference for any other word in said database and (ii) the magnitude of the comparison difference is no greater than a second selected positive error threshold ϵ(thr;2), and accumulating a weighted point each time the at least one word number q" is chosen; and
when the at least one word number q" has a higher number of weighted points than the number of weighted points for any other word in said database, interpreting this condition as indicating that the new SASP includes the word number q".

24. A system for communicating information in an environment that interferes with audible speech, the system comprising:
a receiver-evaluator for receiving at least one of a first sub-audible word or phrase (SAWP) and a second SAWP and for determining if the SAWP is a word or phrase in a SAWP lexicon associated with the evaluator; and
a transmitter for transmitting a SAWP representing at least one of the first and second received SAWPs over a signaling channel to at least one recipient, when the received SAWP is determined to be contained in the SAWP lexicon,
wherein the SAWPs associated with first and second received SAWPs are respective first and second representational SAWPs (Rep-SAWPs) that are chosen to provide optimal likelihood of recognition of the transmitted SAWPs in an ambient environment.

25. The system of claim 24, further comprising a SAWP receiver, associated with said at least one recipient, for receiving and converting said SAWP to at least one of visually perceptible alphanumeric text, audibly perceptible speech, and a coded signal representing said received SAWP.

26. The system of claim 24, wherein said SAWP lexicon includes at least one of the following words and phrases: "evacuate," "Mayday," "mantrap," "fire safe," "stop," "go," "left," "right," "alpha," "omega," "zero," "one," "two," "three," "four," "five," "six," "seven," "eight," and "nine."

27. The system of claim 24, wherein at least one of said first and second Rep-SAWPs is chosen to be at least one of an encoded SAWP, an encrypted SAWP and a SAWP that is transformed to a format that resists signal degradation when transmitted in said ambient environment.

* * * * *